Jan. 2, 1934.  G. F. HOUSTON  1,942,100
PROPELLER
Filed Oct. 31, 1930
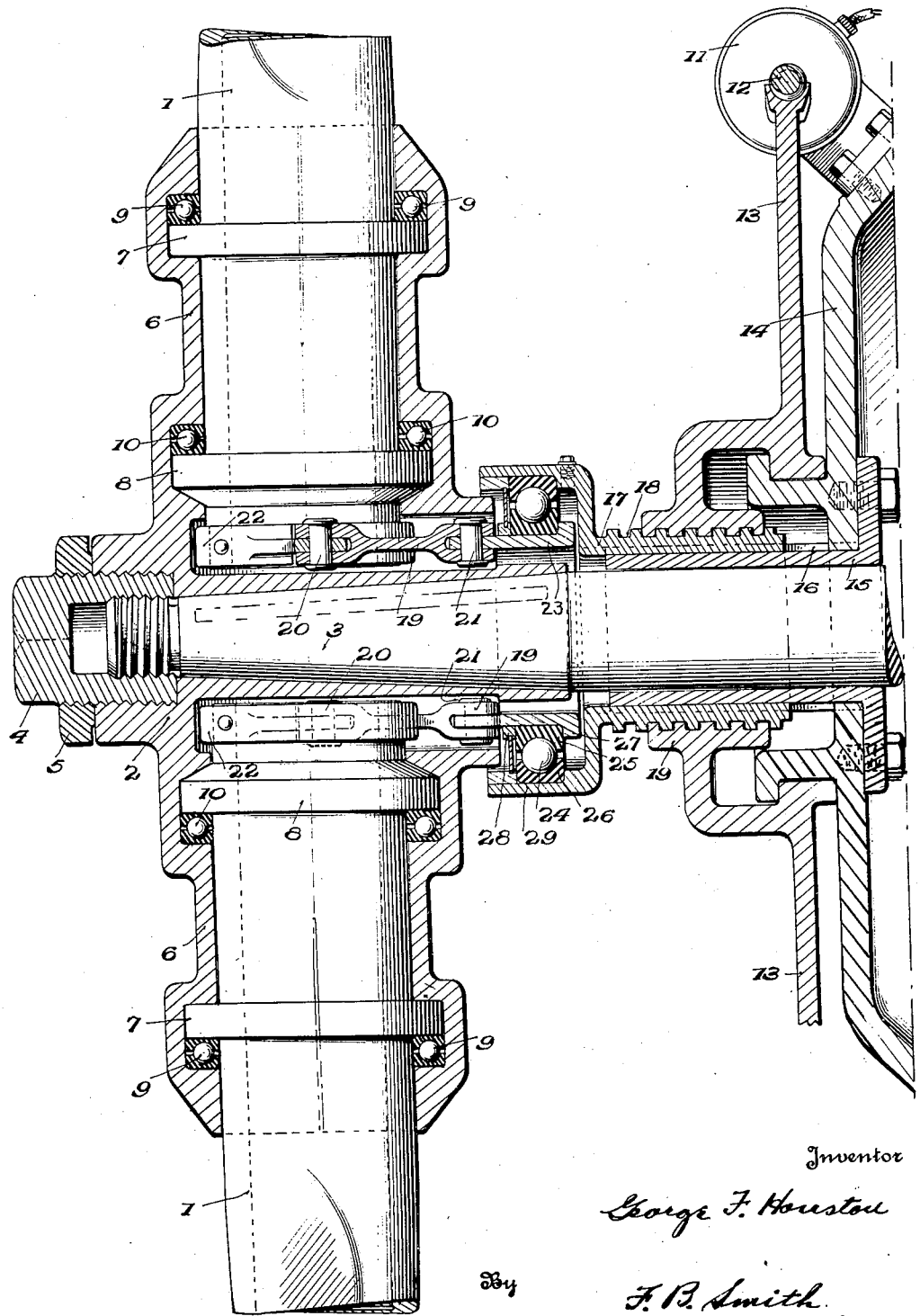
Inventor
George F. Houston
By F. B. Smith
Attorney Patented Jan. 2, 1934

1,942,100

UNITED STATES PATENT OFFICE 1,942,100

PROPELLER

George F. Houston, South Bend, Ind., assignor to Bendix Research Corporation, East Orange, N. J., a corporation of Indiana Application October 31, 1930. Serial No. 492,532

3 Claims. (Cl. 170—163)

This invention relates to propellers and more particularly to propellers having a plurality of radially projected blades the angularity or pitch of which may be varied during operation.

One of the objects of the present invention is to provide novel means for varying the pitch of the blades of a propeller.

Another object is to provide in a variable pitch propeller a novel pitch changing mechanism embodying link members which are relatively light in weight and which rotate with the propeller, the remainder of the mechanism being supported by a relatively stationary portion, whereby a light and compact arrangement is secured.

A further object is to provide in a propeller of the above character, a novel construction and arrangement of parts in order to secure an efficient structure, positive and reliable in operation and of a rugged nature, which features render the device especially adaptable for use on aircraft.

The above and other features of the invention will appear more fully hereinafter from the following detailed description, when taken in connection with the accompanying drawing. It is to be expressly understood, however, that the drawing is employed for the purposes of illustration only, and is not designed as a definition of the limits of the invention, reference being had for this purpose to the appended claims.

Referring to the drawing, the single figure of which is illustrative of one form of the invention, there is shown therein a propeller comprising a plurality of blades 1, carried by a split hub 2, the latter being keyed or otherwise suitably secured to a rotatable shaft 3 which may form an extension of the crankshaft of an internal combustion engine. Preferably a nut 4 and lock nut 5 are provided in order to complete the assembly of the hub with respect to the shaft. As shown, the hub 2 is formed in two parts, split longitudinally, the radially extending portions 6 forming sockets for receiving the root ends of the blades. Any suitable clamping means, not shown, may be employed for securing the two halves of the hub together after assembly. Annular shoulders 7 and 8 formed on the blade roots serve to prevent endwise displacement of the blades, after assembly in the hub, and preferably such shoulders are rotatably mounted with respect to the sockets 6 by means of bearings 9 and 10.

Means are provided for rotating the blades in the hub sockets in order to vary the pitch and preferably such means are power actuated. In the form shown, the pitch-varying means include a reversible power device 11, such as an electric motor, to the armature shaft of which is secured a worm 12 having a non-reversible thread. A worm wheel 13 meshes with the worm 12 and is rotatably mounted on a stationary support 14 to which the motor 11 may also be secured. Suitably attached to the support 14 and arranged concentrically with respect to the drive shaft 3 is a sleeve 15 the exterior surface thereof being provided with longitudinally extending ribs or keys 16 adapted to coact with similar ribs or keys formed interiorly of a sleeve member 17. This last-named member is provided exteriorly with a relatively coarse thread 18 with which a threaded flange 19 formed integrally with the gear 13 cooperates. The above construction is such that rotation of the worm wheel 13 will impart longitudinal movement to the sleeve member 17 which movement is utilized to increase, decrease or reverse the pitch of the propeller blades by controlling the direction of rotation of the reversible power device 11 by suitable means well known in the art, as for example, a reversing switch.

In order to employ the longitudinal movement of the sleeve 17 for rotating the blades in the sockets 6, the said sleeve is operatively connected through a link mechanism with the roots of the blades. As shown, such link mechanism is constituted by a link 19 pivotally connected at either end by means of suitable pivot pins 20 and 21 to a ring 22 carried by the root end of the propeller blade and to a collar 23 encircling the drive shaft. Suitable openings, not shown, may be provided in the propeller hub in order to permit free movement of the pin 20 and link 19.

Means are provided which are interposed between the sleeve 17 and the collar 23 for permitting relative rotation between these two elements in a substantially frictionless manner. As shown, such means are constituted by a suitable bearing 24, confined between inner and outer races 25 and 26 respectively, the inner race being held securely between a flange 27 and a nut 28 on the collar 23, while the outer race is maintained in position within an enlarged portion 29 of the sleeve 17 in any suitable manner. The above construction is such that the bearing means 24 serves to transmit the axial thrust produced by the longitudinal travel of the sleeve 17 to the link mechanism whereby the propeller blades may be rotated about their axes to vary the pitch.

There has thus been provided by the present invention, a propeller wherein novel and efficient means are employed to vary the pitch of the blades. The construction is such that a minimum number of parts are necessary thus resulting in a compact structure which is not only of a rugged nature but also light in weight. By employing the worm and worm gear arrangement together with the power actuating device, a simple and efficient speed reduction is attained whereby the pitch of the blades may be easily varied during operation. Since the worm 12 is provided with a non-reversible thread, no rotation will be imparted to the motor by reason of any tendency of the blades to turn in their sockets due to air pressure, torsion or other forces acting on the blades during operation.

Though there has been illustrated and described only one embodiment of the invention, it is to be understood that the invention is not limited thereto but may be capable of expression in various forms. It is also to be understood that any suitable pilot control mechanism may be associated with the motor in order that rotation of the latter might be arrested upon reaching a position corresponding to a predetermined pitch setting of the blades. Various other changes in the details of construction and arrangement of the component parts of the structure may be resorted to without departing from the spirit of the invention as defined in the appended claims.

What is claimed is:

1. A variable pitch propeller having a hub and a plurality of blades rotatably carried thereby, means for rotating said blades, means for varying the angularity of the blades during rotation, said last-named means comprising an electric motor, a worm connected to the shaft of said motor, a worm gear concentrically disposed with respect to said rotating means and meshing with said worm, a sleeve member, means for connecting the worm gear and sleeve whereby rotation of the former will move the latter longitudinally with respect to the rotating means, said sleeve having a hub portion providing a bearing support, a bearing mounted within said hub portion, an annular member enclosed within said hub portion and providing a bearing support and links enclosed within the said propeller hub and said hub portion and connecting said blades to said annular member.

2. A variable pitch propeller comprising a hub and a plurality of angularly adjustable blades, driving means therefor and means for angularly adjusting the blades during operation, said last-named means comprising power means, a sleeve drivably connected to said power means for longitudinal movement relative to the driving means, said sleeve being provided with a hub portion, bearing means housed within the hub portion, and link mechanisms operatively associated with the blades housed within said hub and hub portion, said mechanisms serving as a support for said bearing means.

3. In a variable pitch propeller having a drive shaft, a hub and a plurality of blades rotatably carried thereby, means for changing the pitch of the blades during operation comprising a member movable longitudinally of the drive shaft but held against rotation, a bearing carried by said member and links connecting said bearing to the blades, said links being wholly enclosed by said hub and said member.

GEORGE F. HOUSTON.